April 29, 1952 W. W. CUSHMAN 2,594,295
REVERSIBLE CONVEYER
Filed Dec. 16, 1947
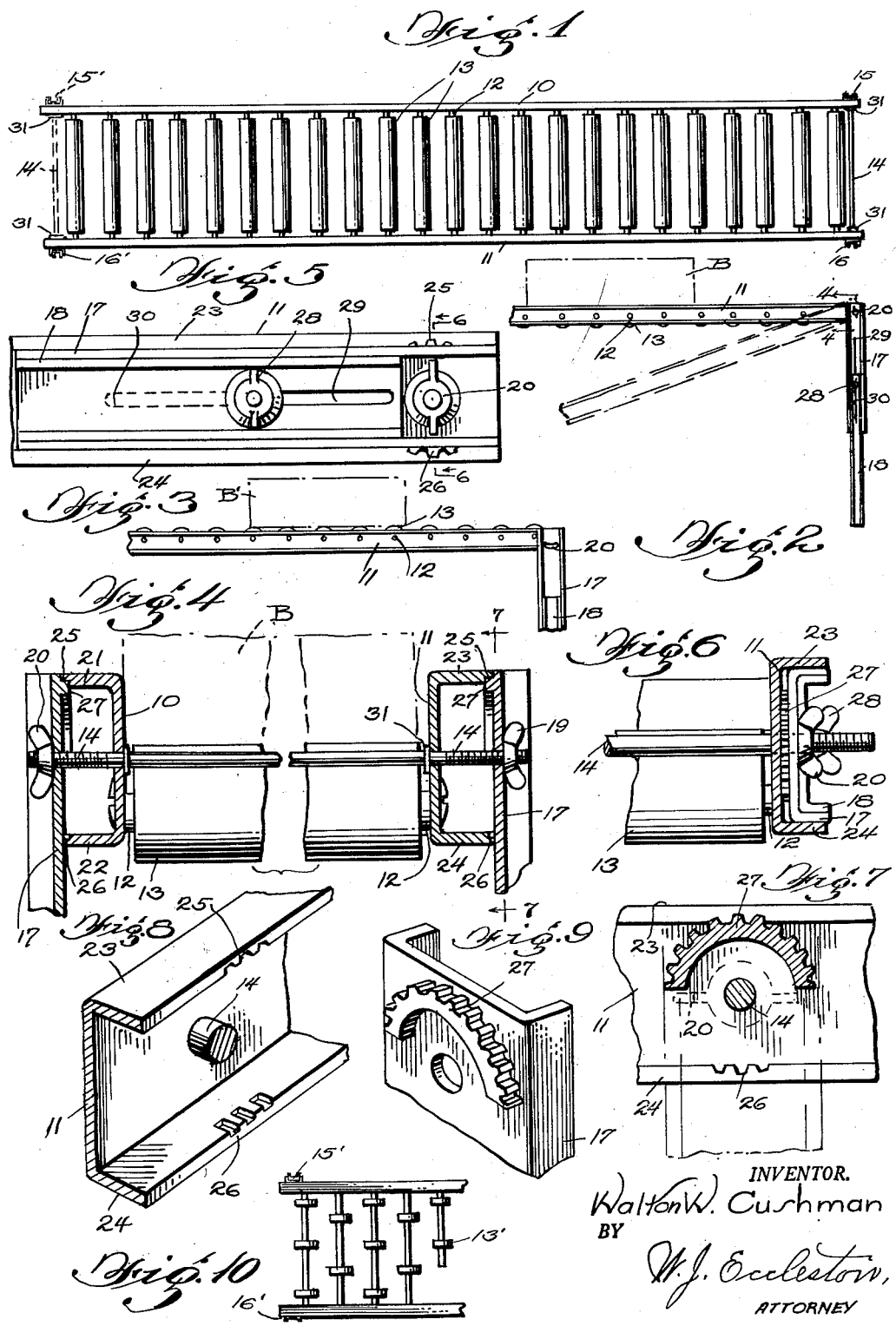
INVENTOR.
Walton W. Cushman
BY
W. J. Eccleston,
ATTORNEY Patented Apr. 29, 1952

2,594,295

UNITED STATES PATENT OFFICE 2,594,295

REVERSIBLE CONVEYER

Walton W. Cushman, Webb City, Mo.

Application December 16, 1947, Serial No. 792,091

10 Claims. (Cl. 193—35)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to conveyors and more particularly to roller conveyors of the gravity type. A principal object of the present invention is to provide a conveyor capable of conveying wide and narrow loads, and compactly foldable to occupy a minimum of space during storage and transportation.

Another object of the present invention is the provision of a reversible conveyor with ground-engaging supports capable of supporting the same in a position for conveying narrow loads and in a reversed position for conveying wide loads.

A further object of the invention is a structural arrangement whereby the supports of a gravity conveyor may be releasably locked to the conveyor rails in a plurality of predetermined angular positions.

Still another object of the invention is a reversible gravity conveyor constructed from strong and readily available structural materials, and which is simple, safe, durable and economical in manufacture and use.

The foregoing and other objects of the present invention are accomplished by a roller conveyor comprising a pair of spaced rails, ground-engaging legs pivoted to the rails and swingable in either direction, releasable locking means for holding the legs and rails in a number of predetermined angular relations, and an eccentric arrangement of the rollers in a manner which will be more fully explained hereafter.

A preferred embodiment of the present invention is illustrated in the accompanying drawing, wherein:

Figure 1 is a plan view of the conveyor set up in an operative position;

Figure 2 is a fragmentary side elevation of the conveyor set up in position to convey a narrow load;

Figure 3 is a fragmentary side elevation of the conveyor set up in reversed position for conveying a wide load;

Figure 4 is an enlarged sectional view taken along lines 4—4 of Figure 2;

Figure 5 is a fragmentary side elevation of the conveyor collapsed in inoperative position;

Figure 6 is a fragmentary sectional view taken along lines 6—6 of Figure 5;

Figure 7 is a fragmentary view, partly in elevation and partly in section, taken along lines 7—7 of Figure 4;

Figures 8 and 9 are perspective views of the end portions of a conveyor rail and of a conveyor support, respectively, showing in detail the locking mechanism for releasable interengagement; and Figure 10 is a fragmentary plan view of a modified structure of a conveyor in accordance with my invention.

Referring to the drawings in greater particularity, reference numerals 10, 11 denote a pair of spaced parallel conveyor rails, which support a plurality of axles or shafts 12, on which in turn are rotatably supported rollers 13. Axles or shafts 12 are not located at the center line of the rails, but proximate one of the edges, and the diameter of the rollers 13 is such that one load-bearing surface thereof is located intermediate the edges of the rails, while another load-bearing surface extends beyond the rails; this arrangement is shown in detail in Figure 4 of the drawings. In this manner, a narrow load may be conveyed over the load-supporting surface situated instermediate the edges of the rails, and the inner faces of the rails act as guides to prevent the load (e. g. box B) from dropping off a side of the conveyor. On the other hand, a load whose width exceeds the distance between the rails can be conveyed on the same conveyor, set up in reversed position wherein that load-bearing surface of the rollers which extends beyond the rails is topmost, and the load (e. g. box B') proceeds above and out of contact with the rails, as shown in Figure 3 of the drawings.

At or near either of the rails is located a transverse shaft 14 and pair of ground-engaging supports or legs 15, 16. Each leg preferably consists of two telescoping sections 17, 18, and is pivotedly secured to the rails on transverse shaft 14. When the conveyor is set up in operative position, either to convey a narrow load as shown in Figure 2, or in a reversed position to convey a wide load as shown in Figure 3, the legs swing into ground-pivotedly secured to shaft 14 carries an arcuate engaging position and are tightened against the rails; e. g., by means of wing nuts 19, 20.

Rail 10 carries upper and lower flanges 21, 22, and rail 11 carries upper and lower flanges 23, 24, extending outwardly. Serrations 25, 26 are arcuately arranged on the inside of the flanges in juxtaposition with shaft 14 near the end of the rails. The end of leg sections 17 which is serrated projection 27, which extends inwardly so as to be interengageable with a serration 25 or 26. In order to adjust the angle between a rail and a leg, nut 19 or 20 is loosened to permit the leg to be shifted outwardly on shaft 14 until the serrations of projections 27 are out of engagement with the serration on the rail flange. The leg is then adjusted to the desired angular position, and again shifted inwardly until the serrations of the projection 27 and of the flange intermesh, and tightened against the outer face of the flange by means of wing nuts 19 or 20.

Sections 17, 18 of the conveyor supports or legs are preferably made of channel iron; the outer width of lower section 18 is such that it corresponds to the inner width of section 17; in this manner, sections 17 and 18 interfit telescopingly. A locking screw 28, which slides in superposed slots 29, 30 of sections 17 and 18 sets the length of a leg at the desired point.

When it is desired to collapse the conveyor for storage or for transportation to a new location, legs 15, 16 are swung to a position parallel to rails 10, 11 and are shifted inwardly on shaft 14 until they are nested within the flanges 21, 22, 23 and 24 of the rails. They are retained in that position by tightening the wing nuts 19 and 20 as shown in Fig. 6 of the drawings. In this position, the conveyor occupies no more space than a conventional gravity conveyor section not equipped with supports.

It will be understood that the terms "roller" and "wheel" are used synonymously throughout specification and claims, inasmuch as the principles of the present invention are applicable to conveyors equipped with cylindrical rollers 13 (see Fig. 1) as well as to conveyors equipped on supporting wheels 13' (see Fig. 10).

A conveyor, in accordance with my invention, may be equipped with conventional end-wise couplings 31 to join together a plurality of conveyor sections into a conveyor line, and/or may be equipped with an additional pair of end-wise pivoted supports 15', 16' to provide a self-sustaining conveyor. By suitably adjusting the angle between rails and supports, and by adjusting the distance between ground and load-conveying surface by means of telescoping the supports to the desired length, the conveyor can be adapted to a great variety of load-conveying situations.

It will thus be seen that my conveyor, a preferred form of which is described in the foregoing specification, is adapted to many military and industrial uses, where compactness, strength and adaptability to narrow and wide loads play an important role. Modifications of the embodiments shown in the drawings and described in the specification will readily occur to the expert without departure from the spirit of my invention. I thus consider any such alterations and modifications within the scope of my invention, and intend to claim the same broadly and to be limited only by the definitions contained in the appended claims.

I claim:

1. A roller conveyor having a pair of rails spacedly secured together, load-supporting rollers rotatably supported between said rails, said rollers having one load-bearing surface intermediate said rails and another load-bearing surface extending beyond said rails, reversible ground-engaging supports pivotedly secured to said rails for selectively securing said conveyor in a position for conveying a narrow load over the first-named load-bearing surface of said rollers and in a reversed position for conveying a wide load over the second-named load-bearing surface of said rollers, and releasable means for adjusting the angles between said rails and said supports to a plurality of predetermined perpendicular and non-perpendicular operative positions of said supports relative to said rails.

2. A roller conveyor having a pair of rails spacedly secured together, said rails having outwardly extending upper and lower flanges, load-supporting rollers rotatably supported between said rails, said rollers having one load-bearing surface intermediate said rails and another load-bearing surface extending beyond said rails, reversible ground-engaging supports pivotedly secured to said rails for selectively securing said conveyor in a position for conveying a narrow load over the first-named load-bearing surface of said rollers and in a reversed position for conveying a wide load over the second-named load-bearing surface of said rollers, and releasable means for adjusting the angles between said rails and said supports to a plurality of predetermined perpendicular and non-perpendicular operative positions of said supports relative to said rails.

3. A roller conveyor having a pair of rails spacedly secured together, said rails having outwardly extending upper and lower flanges, load-supporting rollers rotatably supported between said rails, said rollers having one load-bearing surface intermediate said rails and another load-bearing surface extending beyond said rails, reversible ground-engaging supports pivotedly secured to said rails for selectively securing said conveyor in a position for conveying a narrow load over the first-named load-bearing surface of said rollers and in a reversed position for conveying a wide load over the second-named load-bearing surface of said rollers, said supports being nestable within the flanges of said rails when in inoperative position, and releasable means for adjusting the angles between said rails and said supports to a plurality of predetermined perpendicular and non-perpendicular operative positions of said supports relative to said rails.

4. A roller conveyor having a pair of rails spacedly secured together, said rails having outwardly extending upper and lower flanges, load-supporting rollers rotatably supported between said rails, said rollers having one load-bearing surface intermediate said rails and another load-bearing surface extending beyond said rails, and reversible ground-engaging supports pivotedly and shiftably secured to said rails for selectively securing said conveyor in a position for conveying a narrow load over the first-named load-bearing surface of said rollers, said supports being shiftable transversely of said rails inwardly for nesting between said flanges in inoperative position and outwardly in a plurality of operative ground-engaging positions.

5. A roller conveyor having a pair of rails spacedly secured together, said rails having outwardly extending upper and lower flanges, load-supporting rollers rotatably supported between said rails, said rollers having one load-bearing surface intermediate said rails and another load-bearing surface extending beyond said rails, and reversible ground-engaging supports pivotedly secured to said rails for selectively securing said conveyor in a position for conveying a narrow load over the first-named load-bearing surface of said rollers and in a reversed position for conveying a wide load over the second-named load-bearing surface of said rollers, means for shifting said ground-engaging supports in a direction transverse to said rails, and means for tightening said supports on said rails to releasably maintain said supports and rails in a predetermined angular relation.

6. A roller conveyor having a pair of rails spacedly secured together, said rails having outwardly extending upper and lower flanges, load-supporting rollers rotatably supported between said rails, said rollers having one load-bearing surface intermediate said rails and another load-bearing surface extending beyond said rails, and reversible ground-engaging supports pivotedly secured to said rails for selectively securing said conveyor in a position for conveying a narrow load over the first-named load-bearing surface of said rollers and in a reversed position for conveying a wide load over the second-named load-bearing surface of said rollers, one of said rails having an arcuate recess, and one of said supports having an arcuate projection engageable with said recesses to maintain said support and said rail in a predetermined angular relation selected from a plurality of perpendicular and non-perpendicular positions.

7. A roller conveyor having a pair of rails spacedly secured together, said rails having outwardly extending upper and lower flanges, at least one of said flanges having inner serrations, load-supporting rollers rotatably supported between said rails, said rollers having one load-bearing surface intermediate said rails and another load-bearing surface extending beyond said rails, and reversible ground-engaging supports pivotedly secured to said rails for selectively securing said conveyor in a position for conveying a narrow load over the first-named load-bearing surface of said rollers, at least one of said supports having an arcuate projection engageable with a serration on one of said rails for releasably maintaining said supports and rails in a predetermined angular relation selected from a plurality of perpendicular and non-perpendicular positions.

8. A roller conveyor having a pair of rails spacedly secured together, said rails having outwardly extending upper and lower flanges, opposite serrations on said flanges, load-supporting rollers rotatably supported between said rails, said rails having one load-bearing surface intermediate said rails and another load-bearing surface extending beyond said rails and reversible ground-engaging telescoping supports pivotedly and shiftably secured to said rails for selectively securing said conveyor in a position for conveying a narrow load over the first-named load-bearing surface of said rollers and in a reversed position for conveying a wide load over the second-named load-bearing surface of said rollers, an arcuate serrated projection on each of said supports engageable with a serration on one of said rails for releasably locking said supports in one of a plurality of predetermined angular relations to said rails when said supports are shifted outwardly into ground-engaging operative position, said supports being nestable within the flanges of said rails when shifted inwardly in inoperative position.

9. A gravity conveyor having a pair of spaced rails, flanges on said rails, arcuate serrations on said flanges, ground-engaging supports pivoted to said rails and arcuate projections on said supports interengageable with said serrations to releasably and selectively lock said supports at a plurality of angles to said rails selected from a plurality of perpendicular and non-perpendicular positions.

10. A gravity conveyor having a pair of spaced rails, flanges on said rails, opposite arcuate serrations on said flanges, ground-engaging supports pivoted to said rails and arcuate projections on said supports interengageable with said serrations to releasably and selectively lock said supports at a plurality of angles on either side of said rails selected from a plurality of perpendicular and non-perpendicular positions.

WALTON W. CUSHMAN.

REFERENCES CITED

The following references are of record in the file of this patent:

UNITED STATES PATENTS

| Number | Name | Date |
| --- | --- | --- |
| 259,142 | Hart | June 6, 1882 |
| 1,039,868 | Whitney | Oct. 1, 1912 |
| 1,906,865 | Knox | May 2, 1933 |
| 1,993,519 | Miltenberger | Mar. 5, 1935 |
| 2,199,097 | Chappelle | Apr. 30, 1940 |
| 2,360,133 | Houssiere | Oct. 10, 1944 |

OTHER REFERENCES

The Lamson Co. Copyright 1930, page 8. (Copy in Div. 28.)